United States Patent
Ishino

(10) Patent No.: US 10,119,014 B2
(45) Date of Patent: *Nov. 6, 2018

(54) RUBBER COMPOSITION FOR TIRES, AND PNEUMATIC TIRE

(71) Applicant: SUMITOMO RUBBER INDUSTRIES, LTD., Kobe-shi, Hyogo (JP)

(72) Inventor: Soh Ishino, Kobe (JP)

(73) Assignee: SUMITOMO RUBBER INDUSTRIES, LTD., Kobe-Shi, Hyogo (JP)

( * ) Notice: Subject to any disclaimer, the term of this patent is extended or adjusted under 35 U.S.C. 154(b) by 404 days.

This patent is subject to a terminal disclaimer.

(21) Appl. No.: 14/343,342

(22) PCT Filed: Oct. 16, 2012

(86) PCT No.: PCT/JP2012/076649
§ 371 (c)(1),
(2) Date: Mar. 6, 2014

(87) PCT Pub. No.: WO2013/058219
PCT Pub. Date: Apr. 25, 2013

(65) Prior Publication Data
US 2014/0194552 A1    Jul. 10, 2014

(30) Foreign Application Priority Data

Oct. 17, 2011   (JP) ................. 2011-228204

(51) Int. Cl.
*C08L 9/06* (2006.01)
*B60C 1/00* (2006.01)
*C08L 15/00* (2006.01)
*C08C 19/22* (2006.01)
*C08C 19/44* (2006.01)

(52) U.S. Cl.
CPC ............ *C08L 9/06* (2013.01); *B60C 1/0016* (2013.01); *C08C 19/22* (2013.01); *C08C 19/44* (2013.01); *C08L 15/00* (2013.01); *C08L 2312/00* (2013.01)

(58) Field of Classification Search
CPC ......... B60C 1/0016; C08L 15/00; C08L 9/06; C08C 19/22; C08C 19/44
See application file for complete search history.

(56) References Cited

U.S. PATENT DOCUMENTS

| | | | |
|---|---|---|---|
| 4,914,248 A | 4/1990 | Kitagawa et al. | |
| 4,977,220 A | 12/1990 | Dougherty et al. | |
| 6,906,152 B2 | 6/2005 | Saito et al. | |
| 8,614,272 B2 * | 12/2013 | Uesaka | B60C 1/00 524/493 |
| 8,728,395 B2 | 5/2014 | Suzuki et al. | |
| 9,102,816 B2 * | 8/2015 | Ishino | C08L 15/00 |
| 2005/0124740 A1 | 6/2005 | Klockmann et al. | |
| 2007/0167557 A1 | 7/2007 | Dumke et al. | |
| 2007/0293622 A1 | 12/2007 | Yan | |
| 2008/0033103 A1 | 2/2008 | Kameda et al. | |
| 2010/0099795 A1 | 4/2010 | Uesaka | |
| 2010/0105826 A1 | 4/2010 | Uesaka | |
| 2011/0160337 A1 | 6/2011 | Ishino | |
| 2011/0172344 A1 | 7/2011 | Yoshida et al. | |
| 2011/0245370 A1 * | 10/2011 | Uesaka | B60C 1/00 523/155 |
| 2012/0283354 A1 | 11/2012 | Hattori et al. | |

FOREIGN PATENT DOCUMENTS

| | | |
|---|---|---|
| CN | 102212218 A | 10/2011 |
| EP | 1 075 967 A1 | 2/2001 |
| EP | 1865023 A1 | 12/2007 |
| EP | 1882716 A1 | 1/2008 |

(Continued)

OTHER PUBLICATIONS

Englsih language translation of JP 05-214170, pp. 1-4, (2016).*
Full machine-generated translation of JP 2001-114938.
Full machine-generated translation of JP 2002-179729.
Full machine-generated translation of JP 2006-306962.
Full machine-generated translation of JP 2009-120819.
Full machine-generated translation of JP 2009-263420.
Full machine-generated translation of JP 2011-144323.
Full machine-generated translation of JP 2011-173510.
International Search Report issued in PCT/JP2012/076649, dated Nov. 13, 2012.
International Search Report (Form PCT/ISA/210) dated Nov. 13, 2012, for International Application No. PCT/JP2012/075894.

*Primary Examiner* — Alexander C Kollias
(74) *Attorney, Agent, or Firm* — Birch, Stewart, Kolasch & Birch, LLP

(57) ABSTRACT

Provided are: a rubber composition for tires capable of improving fuel economy, wet grip performance, and abrasion resistance; and a pneumatic tire including the same. Included is a rubber composition for tires including: a diene polymer; silica; and a liquid resin having a softening point of −20 to 20° C., the diene polymer being a modified diene polymer obtained by reacting components (A) and (B), the liquid resin being present in an amount of 3-40 parts by mass per 100 parts by mass of the rubber component, the component (A) being an active alkali metal-terminated conjugated diene polymer obtained by polymerizing a conjugated diene monomer alone or with an aromatic vinyl monomer, in the presence of a component (C), the component (B) being a modifier containing a functional group, the component (C) being a chemical species obtained by reacting an organic alkali metal compound and a compound of Formula (1) below.

(1)

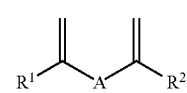

12 Claims, No Drawings

(56) References Cited

FOREIGN PATENT DOCUMENTS

| | | | |
|---|---|---|---|
| EP | 1942120 A1 | 7/2008 | |
| EP | 2138516 A1 | 12/2009 | |
| EP | 2184318 A2 | 5/2010 | |
| EP | 2 338 919 A1 | 6/2011 | |
| EP | 2 371 580 A1 | 10/2011 | |
| JP | 05-214170 * | 8/1993 | ................ C08L 9/06 |
| JP | 2001-114938 A | 4/2001 | |
| JP | 2002-179729 A | 6/2002 | |
| JP | 2005-154769 A | 6/2005 | |
| JP | 2006-306962 A | 11/2006 | |
| JP | 2008-143952 A | 6/2008 | |
| JP | 2008-195791 A | 8/2008 | |
| JP | 2009-120819 A | 6/2009 | |
| JP | 2009-533529 A | 9/2009 | |
| JP | 2009-263420 A | 11/2009 | |
| JP | 2010-248456 A | 11/2010 | |
| JP | 2010-254858 A | 11/2010 | |
| JP | 2011-89066 A | 5/2011 | |
| JP | 2011-144239 A | 7/2011 | |
| JP | 2011-144265 A | 7/2011 | |
| JP | 2011-144322 A | 7/2011 | |
| JP | 2011-144323 A | 7/2011 | |
| JP | 2011-144324 A | 7/2011 | |
| JP | 2011-173510 A | 9/2011 | |
| JP | 2011-178958 A | 9/2011 | |
| JP | 2011-219699 A | 11/2011 | |
| WO | WO 2006/028254 A1 | 3/2006 | |
| WO | WO 2009-147006 A1 | 12/2009 | |
| WO | WO 2010/000299 A1 | 1/2010 | |
| WO | WO-201000299 * | 1/2010 | ........... C08K 5/1525 |
| WO | WO 2010/044252 A1 | 4/2010 | |
| WO | WO 2011/087004 A1 | 7/2011 | |

* cited by examiner

RUBBER COMPOSITION FOR TIRES, AND PNEUMATIC TIRE

TECHNICAL FIELD

The present invention relates to a rubber composition for tires, and a pneumatic tire including the rubber composition.

BACKGROUND ART

There are conventional techniques that improve fuel economy of vehicles by reducing rolling resistance of tires (improving the rolling resistance performance). The recent growing demand for higher fuel economy of vehicles has led to a demand for a rubber composition having excellent performance in terms of low heat build-up (excellent fuel economy) which is used for preparing a tread which is a tire component making up a large part of a tire compared with other tire components.

A known technique for providing a rubber composition with sufficiently low heat build-up is to use a reduced amount of reinforcing filler in the composition. This technique, however, disadvantageously reduces the hardness of the rubber composition and thus softens the tire, which causes reduction in vehicle steering performance (handling stability), wet grip performance, and abrasion resistance.

Patent Literature 1 discloses that a styrene butadiene rubber modified with a certain organic silicon compound containing an alkoxy group can improve fuel economy, wet grip performance, and abrasion resistance. However, in order to achieve satisfactory levels of all of these performance properties, further improvements are needed. Moreover, the modified styrene-butadiene rubber used has only one chain end modified, and modification of both chain ends or modification of two or more chain ends is not considered.

CITATION LIST

Patent Literature

Patent Literature 1: JP 2001-114938 A

SUMMARY OF INVENTION

Technical Problem

The present invention aims to provide a rubber composition for tires capable of solving the above problems and improving fuel economy, wet grip performance, and abrasion resistance, and a pneumatic tire including the rubber composition.

Solution to Problem

The present invention relates to a rubber composition for tires, including: a diene polymer; silica; a liquid resin having a softening point of −20 to 20° C., the diene polymer being a modified diene polymer obtained by reacting a component (A) and a component (B), the liquid resin being present in an amount of 3 to 40 parts by mass per 100 parts by mass of a rubber component of the rubber composition, the component (A) being an active alkali metal-terminated conjugated diene polymer obtained by polymerizing a conjugated diene monomer alone or with an aromatic vinyl monomer, in the presence of a component (C), the component (B) being a modifier containing a functional group, and the component (C) being a chemical species obtained by reacting an organic alkali metal compound and a compound represented by the following Formula (1):

[Chem. 1]

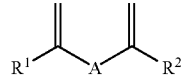

(1)

wherein $R^1$ and $R^2$ are the same as or different from each other, each representing a hydrogen atom, a branched or unbranched alkyl group, a branched or unbranched aryl group, a branched or unbranched alkoxy group, a branched or unbranched silyloxy group, a branched or unbranched acetal group, a carboxyl group, a mercapto group, or a derivative thereof; and A represents a branched or unbranched alkylene group, a branched or unbranched arylene group, or a derivative thereof.

The compound represented by Formula (1) is preferably a compound represented by the following Formula (2):

[Chem. 2]

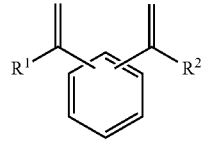

(2)

The modifier is preferably a compound represented by the following Formula (3):

[Chem. 3]

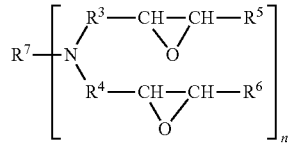

(3)

wherein $R^3$ and $R^4$ are the same as or different from each other, each representing a C1 to C10 hydrocarbon group which may contain at least one group selected from the group consisting of ether and tertiary amine groups; $R^5$ and $R^6$ are the same as or different from each other, each representing a hydrogen atom or a C1 to C20 hydrocarbon group which may contain at least one group selected from the group consisting of ether and tertiary amine groups; $R^7$ represents a C1 to C20 hydrocarbon group which may contain at least one group selected from the group consisting of ether, tertiary amine, epoxy, carbonyl, and halogen groups; and n represents an integer of 1 to 6.

Preferably, the same modifier is introduced into both chain ends of the active conjugated diene polymer.

The rubber component preferably contains 5% by mass or more of the diene polymer based on 100% by mass of the rubber component.

Preferably, the conjugated diene monomer is at least one of 1,3-butadiene and isoprene, and the aromatic vinyl monomer is styrene.

The modified diene polymer is preferably a modified styrene butadiene rubber obtained by polymerizing 1,3-butadiene and styrene.

The liquid resin is preferably at least one selected from the group consisting of liquid coumarone-indene resins, liquid indene resins, and liquid α-methylstyrene resins.

The silica preferably has a nitrogen adsorption specific surface area of 40 to 250 m²/g.

The rubber composition for tires preferably contains at least one of a silane coupling agent represented by Formula (4) below and a silane coupling agent containing a linking unit A represented by Formula (5) below and a linking unit B represented by Formula (6) below:

[Chem. 4]

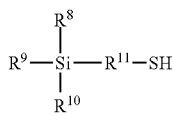

(4)

wherein $R^8$ represents a group represented by —O—($R^{12}$—O)$_m$—$R^{13}$ where m $R^{12}$s are the same as or different from one another, each representing a branched or unbranched divalent C1 to C30 hydrocarbon group, $R^{13}$ represents a branched or unbranched C1 to C30 alkyl group, a branched or unbranched C2 to C30 alkenyl group, a C6 to C30 aryl group, or a C7 to C30 aralkyl group, and m represents an integer of 1 to 30; $R^9$ and $R^{10}$° are the same as or different from each other, each representing a group as defined for $R^8$, a branched or unbranched C1 to C12 alkyl group, or a group represented by —O—$R^{14}$ where $R^{14}$ represents a hydrogen atom, a branched or unbranched C1 to C30 alkyl group, a branched or unbranched C2 to C30 alkenyl group, a C6 to C30 aryl group, or a C7 to C30 aralkyl group; and $R^{11}$ represents a branched or unbranched C1 to C30 alkylene group;

[Chem. 5]

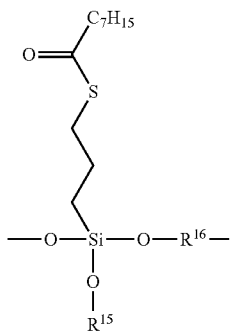

(5)

[Chem. 6]

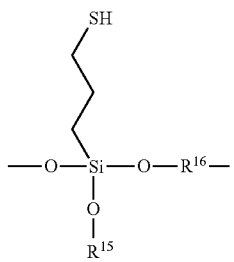

(6)

wherein $R^{15}$ represents hydrogen, a halogen, a branched or unbranched C1 to C30 alkyl group, a branched or unbranched C2 to C30 alkenyl group, a branched or unbranched C2 to C30 alkynyl group, or a group obtained by replacing a terminal hydrogen of the alkyl group with a hydroxyl or carboxyl group; and $R^{16}$ represents a branched or unbranched C1 to C30 alkylene group, a branched or unbranched C2 to C30 alkenylene group, or a branched or unbranched C2 to C30 alkynylene group, provided that $R^{15}$ and $R^{16}$ together may form a ring.

The rubber composition for tires preferably contains a vulcanization accelerator represented by the following Formula (7):

[Chem. 7]

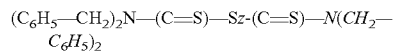

(7)

wherein z represents an integer of 1 to 8.

The rubber composition for tires is preferably intended to be used as a rubber composition for treads.

The present invention also relates to a pneumatic tire, including the rubber composition.

Advantageous Effects of Invention

According to the present invention, the rubber composition for tires contains a specific diene polymer that has been modified, silica, and a specific amount of a liquid resin having a specific softening point. Thus, the rubber composition can improve fuel economy, wet grip performance, and abrasion resistance. The use of the rubber composition in a tire component such as a tread can provide a pneumatic tire excellent in the aforementioned properties.

DESCRIPTION OF EMBODIMENTS

The rubber composition for tires of the present invention contains a diene polymer, silica, and a specific amount of a liquid resin having a specific softening point. The diene polymer is a modified diene polymer obtained by reacting components (A) and (B), wherein the component (A) is an active alkali metal-terminated conjugated diene polymer obtained by polymerizing a conjugated diene monomer alone or with an aromatic vinyl monomer, in the presence of a component (C); the component (B) is a modifier containing a functional group; and the component (C) is a chemical species obtained by reacting an organic alkali metal compound and a compound represented by the following Formula (1):

[Chem. 8]

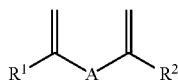

(1)

wherein R¹ and R² are the same as or different from each other, each representing a hydrogen atom, a branched or unbranched alkyl group, a branched or unbranched aryl group, a branched or unbranched alkoxy group, a branched or unbranched silyloxy group, a branched or unbranched acetal group, a carboxyl group, a mercapto group, or a derivative thereof; and A represents a branched or unbranched alkylene group, a branched or unbranched arylene group, or a derivative thereof.

Since the chemical species (C), which is obtained by reacting a compound represented by the Formula (1) and an organic alkali metal compound, is used as a polymerization initiator in the polymerization reaction, both ends of the polymer chain (the component (A) (active conjugated diene polymer)) formed by the polymerization reaction are living polymer ends. Thus, both chain ends of the active conjugated diene polymer (A) can be modified with a modifier (B). The modified diene polymer obtained by modifying both chain ends of the polymer (A) with the modifier (B), provides better fuel economy, wet grip performance, and abrasion resistance than the polymer having only one chain end modified, and it therefore provides a balanced improvement in these properties.

There can be an alternative method for introducing a functional group (modifying group) into both chain ends of the polymer. In this method, polymerization is carried out using a polymerization initiator containing a functional group, and a modifier is reacted with a polymerizing end of the polymer. In this case, the resulting polymer has the functional group derived from the polymerization initiator at one chain end and the functional group derived from the modifier at the other chain end. However, the functional group of the polymerization initiator performs poorly with respect to the balance among fuel economy, wet grip performance, and abrasion resistance because the interaction between a functional group of a polymerization initiator and silica is generally weak. Moreover, functional groups of polymerization initiators are likely to be released, and thus contribute to an increase in energy loss, leading to poor fuel economy. Furthermore, in the case of using a polymerization initiator containing a functional group with high polarity, the functional group is coordinated with a living polymer end and thus affects the reaction between the polymerizing end and a modifier. In this case, a desired functional group cannot be introduced into the polymerizing end.

In contrast, since the component (A) is obtained by using the component (C) as a polymerization initiator, the polymer chain grows in two directions in the polymerization reaction, that is, it has two living polymer ends, which enables introduction of any functional group of any modifier. Therefore, when a rubber composition contains the modified diene polymer obtained by reacting the components (A) and (B), it has an excellent balance among fuel economy, wet grip performance, and abrasion resistance.

The further use of a liquid resin having a specific softening point, in addition to the modified diene polymer and silica, synergistically improves fuel economy, wet grip performance, and abrasion resistance, and provides a rubber composition excellent in fuel economy, wet grip performance, abrasion resistance.

The diene polymer in the present invention is a modified diene polymer obtained by reacting components (A) and (B).

The component (A) is an active alkali metal-terminated conjugated diene polymer obtained by polymerizing a conjugated diene monomer alone or with an aromatic vinyl monomer, in the presence of the component (C). Here, the active conjugated diene polymer has two chain ends terminated with an alkali metal.

The component (C) is a chemical species obtained by reacting an organic alkali metal compound and a compound represented by the following Formula (1):

[Chem. 9]

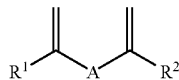

(1)

wherein R¹ and R² are the same as or different from each other, each representing a hydrogen atom, a branched or unbranched alkyl group, a branched or unbranched aryl group, a branched or unbranched alkoxy group, a branched or unbranched silyloxy group, a branched or unbranched acetal group, a carboxyl group (—COOH), a mercapto group (—SH), or a derivative thereof; and A represents a branched or unbranched alkylene group, a branched or unbranched arylene group, or a derivative thereof.

Examples of the branched or unbranched alkyl groups for R¹ and R² include C1 to C30 (preferably C1 to C8, more preferably C1 to C4, and even more preferably C1 and C2) alkyl groups such as methyl, ethyl, n-propyl, isopropyl, n-butyl, iso-butyl, sec-butyl, tert-butyl, pentyl, hexyl, heptyl, 2-ethylhexyl, octyl, nonyl, and decyl groups. The alkyl groups include alkyl groups whose hydrogen atom(s) is(are) replaced with an aryl group(s) (e.g., phenyl group).

Examples of the branched or unbranched aryl groups for R¹ and R² include C6 to C18 (preferably C6 to C8) aryl groups such as phenyl, tolyl, xylyl, naphthyl, and biphenyl groups. The aryl groups include aryl groups whose hydrogen atom(s) is(are) replaced with an alkyl group(s) (e.g., methyl group).

Examples of the branched or unbranched alkoxy groups for R¹ and R² include C1 to C8 (preferably C1 to C6 and more preferably C1 to C4) alkoxy groups such as methoxy, ethoxy, n-propoxy, isopropoxy, n-butoxy, and t-butoxy groups. The alkoxy groups include cycloalkoxy groups (e.g., C5 to C8 cycloalkoxy groups such as a cyclohexyloxy group) and aryloxy groups (e.g., C6 to C8 aryloxy groups such as a phenoxy group and a benzyloxy group).

Examples of the branched or unbranched silyloxy groups for R¹ and R² include silyloxy groups substituted with a C1 to C20 aliphatic or aromatic group (e.g., a trimethylsilyloxy group, a triethylsilyloxy group, a triisopropylsilyloxy group, a diethylisopropylsilyloxy group, a t-butyldimethylsilyloxy group, a t-butyldiphenylsilyloxy group, a tribenzylsilyloxy group, a triphenylsilyloxy group, a tri-p-xylylsilyloxy group).

Examples of the branched or unbranched acetal groups for R¹ and R² include groups represented by —C(RR')—OR" and groups represented by —O—C(RR')—OR". Examples of groups represented by the former formula include methoxymethyl, ethoxymethyl, propoxymethyl, butoxymethyl, isopropoxymethyl, t-butoxymethyl, and neopentyloxymethyl groups. Examples of groups represented by the latter formula include methoxymethoxy, ethoxymethoxy, propoxymethoxy, i-propoxymethoxy, n-butoxymethoxy, t-butoxymethoxy, n-pentyloxymethoxy, n-hexyloxymethoxy, cyclopentyloxymethoxy, and cyclohexyloxymethoxy groups.

$R^1$ and $R^2$ are each preferably a hydrogen atom, a branched or unbranched alkyl group, or a branched or unbranched aryl group. This improves the balance between fuel economy, wet grip performance, and abrasion resistance. $R^1$ and $R^2$ are preferably the same so as to grow the polymer equally in two directions.

Examples of the branched or unbranched alkylene groups for A include C1 to C30 (preferably C1 to C8 and more preferably C1 to C4) alkylene groups such as methylene, ethylene, propylene, butylene, pentylene, hexylene, heptylene, octylene, nonylene, decylene, undecylene, dodecylene, tridecylene, tetradecylene, pentadecylene, hexadecylene, heptadecylene, and octadecylene groups.

Examples of the derivatives of the alkylene groups for A include aryl- or arylene-substituted alkylene groups.

Examples of the arylene groups for A include phenylene, tolylene, xylylene, and naphthylene groups.

Examples of the derivatives of the arylene groups for A include alkylene-substituted arylene groups.

A is preferably a branched or unbranched arylene group, and more preferably a phenylene group (i.e., compounds represented by Formula (2)). With such a structure, the balance among fuel economy, wet grip performance, and abrasion resistance can be improved.

[Chem. 10]

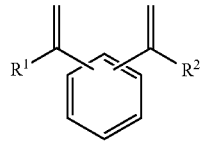

(2)

$R^1$ and $R^2$ in Formula (2) are defined as in the Formula (1)

Specific examples of the compounds represented by Formula (1) or (2) include 1,2-divinylbenzene, 1,3-divinylbenzene, 1,4-divinylbenzene, 1,2-diisopropenylbenzene, 1,3-diisopropenylbenzene, 1,4-diisopropenylbenzene, 1,2-diisobutenylbenzene, 1,3-diisobutenylbenzene, 1,4-diisobutenylbenzene, 1,3-phenylenebis(1-vinylbenzene), 1,4-phenylenebis(1-vinylbenzene), 1,1'-methylenebis(2-vinylbenzene), 1,1'-methylenebis(3-vinylbenzene), and 1,1'-methylenebis(4-vinylbenzene). These may be used alone or in combinations of two or more. Preferred among these are 1,3-divinylbenzene, 1,3-diisopropenylbenzene, and 1,3-phenylenebis(1-vinylbenzene).

Examples of organic alkali metal compounds that can be used in the present invention include hydrocarbon compounds containing an alkali metal such as lithium, sodium, potassium, rubidium, and cesium. Preferred among these are lithium- or sodium-containing compounds having 2 to 20 carbon atoms. Specific examples thereof include ethyllithium, n-propyllithium, iso-propyllithium, n-butyllithium, sec-butyllithium, t-octyllithium, n-decyllithium, phenyllithium, 2-naphthyllithium, 2-butyl-phenyllithium, 4-phenyl-butyllithium, cyclohexyllithium, 4-cyclopentyllithium, and 1,4-dilithio-butene-2. Preferred among these are n-butyllithium and sec-butyllithium because these enable the reaction to proceed rapidly to provide a polymer with a narrow molecular weight distribution.

The method for preparing the component (C) is not particularly limited, as long as the compound represented by Formula (1) and the organic alkali metal compound are brought into contact. Specifically, the component (C) may be prepared by separately dissolving the compound represented by Formula (1) and the organic alkali metal compound in a reaction-inert organic solvent (e.g., a hydrocarbon solvent); and adding dropwise the solution of the organic alkali metal compound to the solution of the compound represented by Formula (1) with stirring. The reaction temperature in preparing the component (C) is preferably 40° C. to 60° C.

The hydrocarbon solvent refers to a solvent that does not deactivate the organic alkali metal compound (alkali metal catalyst), and may suitably be selected from aliphatic hydrocarbons, aromatic hydrocarbons, and alicyclic hydrocarbons, particularly those having 2 to 12 carbons, such as propane, n-butane, iso-butane, n-pentane, iso-pentane, n-hexane, cyclohexane, propene, 1-butene, iso-butene, trans-2-butene, cis-2-butene, 1-pentene, 2-pentene, 1-hexene, 2-hexene, benzene, toluene, xylene, and ethylbenzene. Two or more of these solvents may be used in admixture.

Examples of conjugated diene monomers that can be used in the present invention include 1,3-butadiene, isoprene, 1,3-pentadiene (piperylene), 2,3-dimethyl-1,3-butadiene, and 1,3-hexadiene. Considering the physical properties of the resulting polymer and the availability for industrial purposes, 1,3-butadiene and isoprene are preferred among these.

Examples of aromatic vinyl monomers that can be used in the present invention include styrene, α-methylstyrene, vinyltoluene, vinylnaphthalene, divinylbenzene, trivinylbenzene, and divinylnaphthalene. Considering the physical properties of the resulting polymer and the availability for industrial purposes, styrene is preferred among these.

The monomer may be the conjugated diene monomer alone or a combination of the conjugated diene monomer and the aromatic vinyl monomer. When the conjugated diene monomer and the aromatic vinyl monomer are used in combination, the ratio by mass of these monomers ([conjugated diene monomer]/[aromatic vinyl monomer]) is preferably 50/50 to 90/10, and more preferably 55/45 to 85/15. If the ratio is lower than 50/50, the polymerized rubber may be insoluble in a hydrocarbon solvent, which may make it impossible to cause uniform polymerization. Conversely, if the ratio is higher than 90/10, the strength of the polymerized rubber may be lowered.

The modified diene polymer is preferably one obtained by copolymerizing the conjugated diene monomer and the aromatic vinyl monomer, and particularly preferably one obtained by copolymerizing 1,3-butadiene and styrene (i.e. modified styrene butadiene rubber). The use of such a modified copolymer improves fuel economy, wet grip performance, and abrasion resistance. Further, the combined use with silica and the liquid resin having a specific softening point synergistically improves fuel economy, wet grip performance, and abrasion resistance.

The method for preparing the component (A) is not particularly limited, as long as the component (C) is used as a polymerization initiator. Conventionally known methods may be employed. Specifically, the conjugated diene monomer, or the conjugated diene monomer and the aromatic vinyl monomer is (are) polymerized in a reaction-inert organic solvent (e.g., hydrocarbon solvent) using the component (C) as an polymerization initiator, optionally in the presence of a randomizer. Thus, the target active conjugated diene polymer with two chain ends terminated with an alkali metal is formed.

The hydrocarbon solvent may suitably be as mentioned for the preparation of the component (C).

The randomizer refers to a compound having the function of controlling the microstructure of a conjugated diene portion of a polymer, for example, increase of 1,2-butadiene units or 3,4-isoprene units, or the function of controlling the compositional distribution of monomer units in a polymer, for example, randomization of butadiene units and styrene units in a butadiene-styrene copolymer.

The randomizer may be any compound. Considering the availability for industrial purposes, particularly ether compounds and tertiary amines are preferred. Examples of ether compounds include cyclic ethers such as tetrahydrofuran, tetrahydropyran, and 1,4-dioxane; aliphatic monoethers such as diethyl ether and dibutyl ether; aliphatic diethers such as ethylene glycol dimethyl ether, ethylene glycol diethyl ether, ethylene glycol dibutyl ether, diethylene glycol diethyl ether, and diethylene glycol dibutyl ether; and aromatic ethers such as diphenyl ether and anisole. Examples of tertiary amines include triethylamine, tripropylamine, and tributylamine, as well as N,N,N',N'-tetramethylethylenediamine, N,N-diethylaniline, pyridine, and quinoline.

The component (B) is a modifier containing a functional group. The component (B) is preferably a compound containing a functional group that contains at least one atom selected from the group consisting of nitrogen, oxygen, and silicon atoms.

Examples of the functional groups include amino, amido, alkoxysilyl, isocyanate, imino, imidazole, urea, ether (in particular, epoxy), carbonyl, carboxyl, hydroxyl, nitrile, pyridyl, and diglycidylamino groups. These functional groups may be substituted. Preferred among these are amino, alkoxysilyl, ether (in particular, epoxy), carbonyl, hydroxyl, carboxyl, and diglycidylamino groups because they are highly reactive with silica.

The component (B) is preferably a compound represented by Formula (3) below. It is preferable that a single modifier (B) be used (or in other words, the same modifier be introduced into both chain ends of the component (A)). When a single modifier (B) is used, the same functional group can be introduced into both chain ends of the component (A), and thus the polymer can have uniform chain ends which make the reactivity of the polymer with silica stable.

The compound represented by the formula (3) is a polyfunctional compound having two or more epoxy groups. These epoxy groups will react with the active chain ends of the active conjugated diene polymer (A). As a result of the reaction, hydroxyl groups can be introduced into the polymer chain. Moreover, since the polyfunctional compound has two or more epoxy groups per molecule, one molecule of the polyfunctional compound will react with active chain ends of multiple molecules of the active conjugated diene polymer (A). As a result of the reaction, two or more polymer chains can be coupled. Thus, the resulting modified diene polymer may include ones having three or more sites (e.g. chain ends) modified with the polyfunctional compound. The balance among fuel economy, wet grip performance, and abrasion resistance can be more improved as the number of modified sites (e.g. modified chain ends) of the modified diene polymer increases.

[Chem. 11]

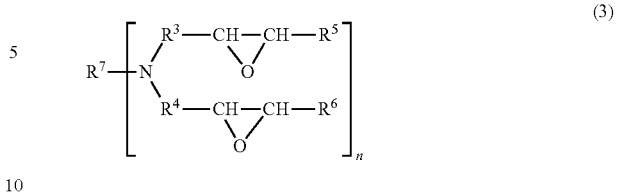

In Formula (3), $R^3$ and $R^4$ are the same as or different from each other, each representing a C1 to C10 hydrocarbon group which may contain at least one group selected from the group consisting of ether and tertiary amine groups; $R^5$ and $R^6$ are the same as or different from each other, each representing a hydrogen atom or a C1 to C20 hydrocarbon group which may contain at least one group selected from the group consisting of ether and tertiary amine groups; $R^7$ represents a C1 to C20 hydrocarbon group which may contain at least one group selected from the group consisting of ether, tertiary amine, epoxy, carbonyl, and halogen groups; and n represents an integer of 1 to 6.

$R^3$ and $R^4$ are each preferably a C1 to O10 (preferably C1 to C3) alkylene group. $R^5$ and $R^6$ are each preferably a hydrogen atom. $R^7$ may be a C3 to 20 (preferably C6 to C10, and more preferably C8) hydrocarbon group, and is preferably a cycloalkyl group, a cycloalkylene group, or a cycloalkanetriyl group, such as those represented by the formulae below. It is more preferably a cycloalkylene group.

[Chem. 12]

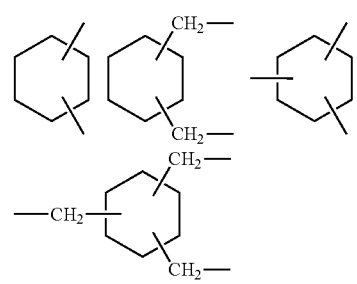

Furthermore, n is preferably 2 or 3. Suitable examples of the compound represented by Formula (3) include tetraglycidyl metaxylenediamine, tetraglycidyl aminodiphenylmethane, tetraglycidyl-p-phenylenediamine, diglycidyl aminomethylcyclohexane, and tetraglycidyl-1,3-bisaminomethylcyclohexane In the present invention, the diene polymer (modified diene polymer) can be formed by reacting the components (A) and (B) in a reaction-inert organic solvent, such as a hydrocarbon solvent.

The hydrocarbon solvent may suitably be as mentioned for the preparation of the component (C).

The amount of the modifier (B) containing a functional group is preferably 0.1 to 10 mol, and more preferably 0.5 to 2 mol, per mole of the organic alkali metal compound. The use of less than 0.1 mol of the modifier provides little improvement in fuel economy. Conversely, if the amount of the modifier is more than 10 mol, a portion of the modifier (B) remains in the polymerization solvent, and there are therefore some economic disadvantages in that, for example, a step for removing the remaining portion from the solvent is necessary to recycle the solvent.

Since the reaction between the components (A) and (B) rapidly proceeds, the reaction temperature and the reaction time can be selected from wide ranges. Generally, the reaction temperature ranges from room temperature (25° C.) to 80° C. and the reaction time ranges from a few seconds to several hours. Any method may be employed for the reaction as long as the components (A) and (B) are brought into contact. In a non-limiting preferred method for the reaction, for example, the diene polymer is formed by polymerization using the component (C), and a predetermined amount of the component (B) is then added to the polymer solution.

A coupling agent represented by the general formula: $R_aMX_b$ may be added before or after the reaction between the components (A) and (B) from the viewpoint of keadability (in the formula, R represents an alkyl group, an alkenyl group, an cycloalkenyl group, or an aromatic hydrocarbon group; M represents a silicon atom or a tin atom; X represents a halogen atom; "a" represents an integer of 0 to 2; and b represents an integer of 2 to 4). The amount of the coupling agent is preferably 0.03 to 0.4 mol, and more preferably 0.05 to 0.3 mol, per mole of the organic alkali metal compound (alkali metal catalyst) used. The use of less than 0.03 mol of the coupling agent provides little improvement in processability. Conversely, the use of more than 0.4 mol of the coupling agent reduces the number of alkali metal chain ends that can react with the modifier containing a functional group, and thus reduces the improvement in fuel economy.

After completion of the reaction, the modified diene polymer can be solidified by a known technique commonly used in the production of rubber by solution polymerization (e.g., the addition of a coagulant, or steam coagulation), and then can be separated from the reaction solvent. The solidifying temperature is not limited at all.

The solidified mass separated from the reaction solvent can be dried to provide the diene polymer (modified diene polymer). The solidified mass may be dried with a drier commonly used in the production of synthetic rubber, such as a band drier and an extrusion drier. The drying temperature is not limited at all.

The diene polymer preferably has a Mooney viscosity ($ML_{1+4}$) (100° C.) of 10 to 200, and more preferably 20 to 150. The upper limit thereof is further more preferably not more than 100, and particularly preferably not more than 75. If the Mooney viscosity is less than 10, the vulcanizate may have reduced mechanical properties (e.g. reduced tensile strength). Conversely, if the viscosity is more than 200, the diene polymer, when combined with other rubbers, may have poor compatibility, thereby deteriorating processability. Further, the resulting vulcanized rubber composition may have reduced mechanical properties. The Mooney viscosity herein can be determined by the method described in EXAMPLES.

The vinyl content in the conjugated diene portion of the diene polymer is not particularly limited, and is preferably 10 to 70 mol %, and more preferably 15 to 60 mol %. The lower limit thereof is furthermore preferably not less than 35 mol %, particularly preferably not less than 40 mol %, and most preferably not less than 50 mol %. If the vinyl content is less than 10 mol %, the glass transition temperature of the polymer may be so low that when the polymer is used for tires, grip performance (wet grip performance) can be poor. Conversely, if the vinyl content is more than 70 mol %, the glass transition temperature of the polymer may be increased, possibly resulting in poor impact resilience.

The vinyl content (1,2-butadiene unit content) can be measured by infrared absorption spectrometry.

The amount of the diene polymer based on 100% by Mass of the rubber component is preferably 5% by mass or more, more preferably 10% by mass or more, even more preferably 40% by mass or more, and particularly preferably 60% by mass or more. If the amount is less than 5% by mass, the fuel economy, wet grip performance, and abrasion resistance may be insufficient. The amount of the diene polymer may be 100% by mass, and is preferably 90% by mass or less.

The rubber composition of the present invention may contain, in addition to the diene polymer, other rubber materials. Examples of other rubber materials include natural rubber (NR), butadiene rubber (BR), styrene butadiene rubber (SBR), styrene isoprene butadiene rubber (SIBR), ethylene propylene diene rubber (EPDM), chloroprene rubber (CR), and acrylonitrile butadiene rubber (NBR). These rubber materials may be used alone or in combinations of two or more. Preferred among these are NR and BR because they improve rubber strength and provide high abrasion resistance and high crack growth resistance.

The NR is not particularly limited, and may be one commonly used in the tire industry, such as SIR20, RSS#3, and TSR20.

If the rubber composition of the present invention contains NR, the amount of NR based on 100% by mass of the rubber component is preferably 5% by mass or more, and more preferably 10% by mass or more. If the amount of NR is less than 5% by mass, the rubber strength may be insufficient, and the abrasion resistance and also fuel economy may be lowered. The amount of NR is preferably 40% by mass or less, and more preferably 30% by mass or less. If the amount of NR is more than 40% by mass, the grip performance (wet grip performance) may be reduced.

The BR is not particularly limited. Examples thereof include: high cis BRs such as BR1220 and BR1250H (Zeon Corporation) and BR130B and BR150B (Ube Industries); and BRs containing syndiotactic polybutadiene crystals, such as VCR412 and VCR617 (Ube Industries). Preferred among these are BRs having a cis content of 95% by mass or more because they have low glass transition temperatures (Tg) and provide good abrasion resistance.

If the rubber composition of the present invention contains BR, the amount of BR based on 100% by mass of the rubber component is preferably 5% by mass or more, and more preferably 10% by mass or more. If the amount of BR is less than 5% by mass, the crack growth resistance, abrasion resistance, and fuel economy may be reduced. The amount of BR is preferably 40% by mass or less, and more preferably 30% by mass or less. If the amount of BR is more than 40% by mass, the grip performance (wet grip performance) may be reduced.

The rubber composition of the present invention contains silica. The use of silica in combination with the diene polymer and the liquid resin having a specific softening point synergistically improves fuel economy, wet grip performance, and abrasion resistance. The silica is not particularly limited, and may be dry silica (silicic anhydride), wet silica (hydrous silicic acid), or the like. Wet silica is preferred because it has more silanol groups.

The silica preferably has a nitrogen adsorption specific surface area ($N_2SA$) of 40 $m^2/g$ or greater, more preferably 50 $m^2/g$ or greater, even more preferably 100 $m^2/g$ or greater, and particularly preferably 150 $m^2/g$ or greater. If the silica has a $N_2SA$ of smaller than 40 $m^2/g$, the tensile strength at break and abrasion resistance tend to be reduced. The silica preferably has a $N_2SA$ of 250 $m^2/g$ or smaller, more preferably 220 m²/g or smaller, and even more preferably 200 m²/g or smaller. If the silica has a $N_2SA$ of greater than 250 m²/g, the fuel economy and processability tend to be reduced.

The nitrogen adsorption specific surface area of silica may be measured by the BET method in accordance with ASTM D3037-81.

The amount of silica per 100 parts by mass of the rubber component is preferably 10 parts by mass or more, more preferably 20 parts by mass or more, and even more preferably 30 parts by mass or more. If the amount of silica is less than 10 parts by mass, the silica used tends not to exert a sufficient effect. The amount of silica is preferably 150 parts by mass or less, more preferably 120 parts by mass or less, and even more preferably 100 parts by mass or less. If the amount of silica is more than 150 parts by mass, the silica is less likely to disperse into the rubber composition, and thus the rubber composition tends to have deteriorated processability and abrasion resistance.

In the present invention, the silica is preferably used in combination with a silane coupling agent. Examples of silane coupling agents include sulfide-, mercapto-, vinyl-, amino-, glycidoxy-, nitro-, and chloro-type silane coupling agents. Sulfide- and mercapto-type silane coupling agents are preferred, and mercapto-type silane coupling agents are particularly preferred.

The rubber composition for tires of the present invention preferably contains, as a mercapto-type silane coupling agent, a silane coupling agent represented by Formula (4) below and/or a silane coupling agent containing a linking unit A represented by Formula (5) below and a linking unit B represented by Formula (6) below.

The use of the silane coupling agent represented by Formula (4) further improves fuel economy, wet grip performance and abrasion resistance as compared with sulfide-type silane coupling agents conventionally used in rubber compositions for tires, such as bis (3-triethoxysilylpropyl) tetrasulfide.

In particular, the combined use of the diene polymer, silica, the liquid resin having a specific softening point, and the silane coupling agent represented by Formula (4) synergistically improves the aforementioned properties.

[Chem. 13]

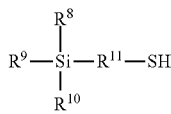
(4)

In Formula (4), $R^8$ represents a group represented by —O—$(R^{12}$—O$)_m$—$R^{13}$ where m $R^{12}$s are the same as or different from one another, each representing a branched or unbranched divalent C1 to C30 hydrocarbon group; $R^{13}$ represents a branched or unbranched C1 to C30 alkyl group, a branched or unbranched C2 to C30 alkenyl group, a C6 to C30 aryl group, or a C7 to C30 aralkyl group; and m represents an integer of 1 to 30.

$R^{12}$s are the same as or different from one another, each representing a branched or unbranched divalent C1 to C30 (preferably C1 to C10, and more preferably C1 to C3) hydrocarbon group.

Examples of the hydrocarbon groups include branched or unbranched C1 to C30 alkylene groups, branched or unbranched C2 to C30 alkenylene groups, branched or unbranched C2 to C30 alkynylene groups, and C6 to C30 arylene groups. The alkylene groups are preferred.

Examples of the branched or unbranched C1 to C30 (preferably C1 to C10, and more preferably C1 to C3) alkylene groups for $R^{12}$ include methylene, ethylene, propylene, butylene, pentylene, hexylene, heptylene, octylene, nonylene, decylene, undecylene, dodecylene, tridecylene, tetradecylene, pentadecylene, hexadecylene, heptadecylene, and octadecylene groups.

Examples of the branched or unbranched C2 to C30 (preferably C2 to C10, and more preferably C2 to C5) alkenylene groups for $R^{12}$ include vinylene, 1-propenylene, 2-propenylene, 1-butenylene, 2-butenylene, 1-pentenylene, 2-pentenylene, 1-hexenylene, 2-hexenylene, and 1-octenylene groups.

Examples of the branched or unbranched C2 to C30 (preferably C2 to C10, and more preferably C2 to C5) alkynylene groups for $R^{12}$ include ethynylene, propynylene, butynylene, pentynylene, hexynylene, heptynylene, octynylene, nonynylene, decynylene, undecynylene, and dodecynylene groups.

Examples of the C6 to C30 (preferably C6 to C10) arylene groups include phenylene, tolylene, xylylene, and naphthylene groups.

Further, m represents an integer of 1 to 30 (preferably 2 to 10, more preferably 3 to 7, and even more preferably 5 or 6). If m is 0, the silane coupling agent is less likely to come close to silica, and thus its reaction with silica is less likely to occur. If m is 31 or greater, the molecules of the silane coupling agent tend to aggregate and thus the silane coupling agent is less likely to come close to silica and to react with silica.

$R^{13}$ represents a branched or unbranched C1 to C30 alkyl group, a branched or unbranched C2 to C30 alkenyl group, a C6 to C30 aryl group, or a C7 to C30 aralkyl group. In particular, $R^{13}$ is preferably a branched or unbranched $C_{1-30}$ alkyl group because of less steric hindrance.

Examples of the branched or unbranched C1 to C30 (preferably C5 to C25, and more preferably C10 to C15) alkyl groups for $R^{13}$ include methyl, ethyl, n-propyl, isopropyl, n-butyl, iso-butyl, sec-butyl, tert-butyl, pentyl, hexyl, heptyl, 2-ethylhexyl, octyl, nonyl, decyl, undecyl, dodecyl, tridecyl, tetradecyl, pentadecyl, and octadecyl groups.

Examples of the branched or unbranched C2 to C30 (preferably C5 to C25, and more preferably C10 to C15) alkenyl groups for $R^{13}$ include vinyl, 1-propenyl, 2-propenyl, 1-butenyl, 2-butenyl, 1-pentenyl, 2-pentenyl, 1-hexenyl, 2-hexenyl, 1-octenyl, decenyl, undecenyl, dodecenyl, tridecenyl, tetradecenyl, pentadecenyl, and octadecenyl groups.

Examples of the C6 to C30 (preferably C10 to C25) aryl groups for $R^{13}$ include phenyl, tolyl, xylyl, naphthyl, and biphenyl groups.

Examples of the C7 to C30 (preferably C10 to C25) aralkyl groups for $R^{13}$ include benzyl and phenethyl groups.

Specific examples of the group of $R^8$ in Formula (4) include —O—$(C_2H_4$—O$)_5$—$C_{11}H_{23}$, —O—$(C_2H_4$—O$)_5$—$C_{12}H_{25}$, —O—$(C_2H_4$—O$)_5$—$C_{13}H_{27}$, —O—$(C_2H_4$—O$)_5$—$C_{14}H_{29}$, —O—$(C_2H_4$—O$)_5$—$C_{15}H_{31}$, —O—$(C_2H_4$—O$)_3$—$C_{13}H_{27}$, —O—$(C_2H_4$—O$)_4$—$C_{13}H_{27}$, —O—$(C_2H_4$—O$)_6$—$C_{13}H_{27}$, and —O—$(C_2H_4$—O$)_7$—$C_{13}H_{27}$. Preferred among these are —O—$(C_2H_4$—O$)_5$—$C_{11}H_{23}$, —O—$(C_2H_4$—O$)_5$—$C_{13}H_{27}$, —O—$(C_2H_4$—O$)_5$—$C_{15}H_{31}$, and —O—$(C_2H_4$—O$)_6$—$C_{13}H_{27}$.

$R^9$ and $R^{10}$ are the same as or different from each other, and each represent a group as defined for $R^8$ (i.e., a group represented by —O—$(R^{12}$—O$)_m$—$R^{13}$), a branched or unbranched C1 to C12 alkyl group, or a group represented by —O—R$^{14}$ wherein R$^{14}$ represents a hydrogen atom, a branched or unbranched C1 to C30 alkyl group, a branched or unbranched C2 to C30 alkenyl group, a C6 to C30 aryl group, or a C7 to C30 aralkyl group. Preferred among these are groups as defined for R$^8$ and groups represented by —O—R$^{14}$ where R$^{14}$ is a branched or unbranched C1 to C30 alkyl group, because they increase the probability of the contact between the silane coupling agent and silica.

Examples of the branched or unbranched C1 to C12 alkyl groups for R$^9$ and R$^{10}$ include methyl, ethyl, n-propyl, isopropyl, n-butyl, iso-butyl, sec-butyl, tert-butyl, pentyl, hexyl, heptyl, 2-ethylhexyl, octyl, and nonyl groups.

Examples of the branched or unbranched C1 to C30 (preferably C1 to C10, and more preferably C1 to C3) alkyl groups for R$^{14}$ include those listed above for the branched or unbranched C1 to C30 alkyl groups for R$^{13}$.

Examples of the branched or unbranched C2 to C30 alkenyl groups for R$^{14}$ include those listed above for the branched or unbranched C2 to C30 alkenyl groups for R$^{13}$.

Examples of the C6 to C30 aryl groups for R$^{14}$ include those listed above for the C6 to C30 aryl groups for R$^{13}$.

Examples of the C7 to C30 aralkyl groups for R$^{14}$ include those listed above for the C7 to C30 aralkyl groups for R$^{13}$.

Specific examples of the groups of R$^9$ and R$^{10}$ in Formula (4) include —O—(C$_2$H$_4$—O)$_5$—C$_{11}$H$_{23}$, —O—(C$_2$H$_4$—O)$_5$—C$_{12}$H$_{25}$, —O—(C$_2$H$_4$—O)$_5$—C$_{13}$H$_{27}$, —O—(C$_2$H$_4$—O)$_5$—C$_{14}$H$_{29}$, —O—(C$_2$H$_4$—O)$_5$—C$_{15}$H$_{31}$, —O—(C$_2$H$_4$—O)$_3$—C$_{13}$H$_{27}$, —O—(C$_2$H$_4$—O)$_4$—C$_{13}$H$_{27}$, —O—(C$_2$H$_4$—O)$_6$—C$_{13}$H$_{27}$, —O—(C$_2$H$_4$—O)$_7$—C$_{13}$H$_{27}$, C$_2$H$_5$—O—, CH$_3$—O, CH$_3$—O—, and C$_3$H$_7$—O—. Preferred among these are —O—(C$_2$H$_4$—O)$_5$—C$_{11}$H$_{23}$, —O—(C$_2$H$_4$—O)$_5$—C$_{13}$H$_{27}$, —O—(C$_2$H$_4$—O)$_5$—C$_{15}$H$_{31}$, —O—(C$_2$H$_4$—O)$_6$—C$_{13}$H$_{27}$, and C$_2$H$_5$—O—.

Examples of the branched or unbranched C1 to C30 (preferably C1 to C10, and more preferably C1 to C5) alkylene groups include those listed above for the branched or unbranched C1 to C30 alkylene groups for R$^{12}$.

Examples of the silane coupling agents represented by Formula (4) include Si363 (produced by Evonik Degussa). The silane coupling agents may be used alone or in combinations of two or more.

The use of the silane coupling agent containing a linking unit A represented by Formula (5) below and a linking unit B represented by Formula (6) below more improves fuel economy, wet grip performance, and abrasion resistance as compared with sulfide silane coupling agents conventionally used in rubber compositions for tires, such as bis(3-triethoxysilylpropyl)tetrasulfide. In particular, the combined use of the modified diene polymer, silica, the liquid resin having a specific softening point, and the silane coupling agent containing a linking unit A represented by Formula (5) and a linking unit B represented by Formula (6) synergistically improves the aforementioned properties.

[Chem. 14]

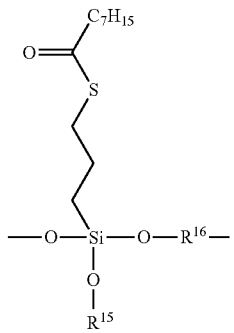

(5)

[Chem. 15]

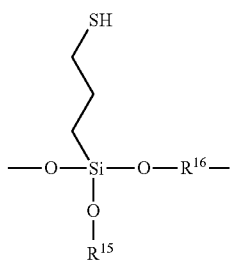

(6)

In Formulae (5) and (6), R$^{15}$ represents hydrogen, a halogen, a branched or unbranched C1 to C30 alkyl group, a branched or unbranched C2 to C30 alkenyl group, a branched or unbranched C2 to C30 alkynyl group, or a group obtained by replacing a terminal hydrogen of the alkyl group with a hydroxyl or carboxyl group; and R$^{16}$ represents a branched or unbranched C1 to C30 alkylene group, a branched or unbranched C2 to C30 alkenylene group, or a branched or unbranched C2 to C30 alkynylene group, provided that R$^{15}$ and R$^{16}$ together may form a ring.

The silane coupling agent with the above structure, which contains the linking unit A and the linking unit B, suppresses an increase in viscosity during processing as compared to polysulfide silanes such as bis-(3-triethoxysilylpropyl)tetrasulfide. This seems to be due to the C—S—C bond in the sulfide moiety of the linking unit A. The C—S—C bond makes the silane coupling agent thermally more stable than tetrasulfide or disulfide is, resulting in a smaller increase in Mooney viscosity.

In the case of using the silane coupling agent containing the linking unit A and the linking unit B, the scorch time is less likely to be reduced as compared with the case of using a mercaptosilane such as 3-mercaptopropyltrimethoxysilane. This seems to be for the following reason. The —SH group of the linking unit B, which has a mercaptosilane structure, is covered by the —C7H$_{15}$ moiety of the linking unit A, so that the —SH group is less likely to react with polymers. Scorching is thereby less likely to occur. The silane coupling agent with the linking units A and B thus prevents deterioration of abrasion resistance and thus provides a balanced improvement in fuel economy, wet grip performance, and abrasion resistance.

The linking unit A content in the silane coupling agent with the above structure is preferably 30 mol % or more, more preferably 50 mol % or more, and is preferably 99 mol % or less, more preferably 90 mol % or less, because the effect of the present invention can be well achieved when the linking unit A content is within the range mentioned above. The linking unit B content is preferably 5 mol % or more, more preferably 10 mol % or more, and preferably 65 mol % or less, and more preferably 55 mol % or less. The combined content of the linking units A and B is preferably 95 mol % or more, more preferably 98 mol % or more, and particularly preferably 100 mol %.

It should be noted that the linking unit A or B content refers to the content including the linking unit A or B located at a chain end of the silane coupling agent, if present. In the case that the linking unit A or B is located at a chain end of the silane coupling agent, the form of this linking unit is not particularly limited as long as it forms a unit corresponding to the formula (5) or (6) representing the linking unit A or B.

Examples of the halogens for $R^{15}$ include chlorine, bromine, and fluorine.

Examples of the branched or unbranched C1 to C30 alkyl groups for $R^{15}$ include methyl, ethyl, n-propyl, isopropyl, n-butyl, iso-butyl, sec-butyl, tert-butyl, pentyl, hexyl, heptyl, 2-ethylhexyl, octyl, nonyl, and decyl groups. The carbon number of the alkyl group is preferably 1 to 12.

Examples of the branched or unbranched C2 to C30 alkenyl groups for $R^{15}$ include vinyl, 1-propenyl, 2-propenyl, 1-butenyl, 2-butenyl, 1-pentenyl, 2-pentenyl, 1-hexenyl, 2-hexenyl, and 1-octenyl groups. The carbon number of the alkenyl group is preferably 2 to 12.

Examples of the branched or unbranched C2 to C30 alkynyl groups for $R^{15}$ include ethynyl, propynyl, butynyl, pentynyl, hexynyl, heptynyl, octynyl, nonynyl, decynyl, undecynyl, and dodecynyl groups. The carbon number of the alkynyl group is preferably 2 to 12.

Examples of the branched or unbranched C1 to C30 alkylene groups for $R^{16}$ include ethylene, propylene, butylene, pentylene, hexylene, heptylene, octylene, nonylene, decylene, undecylene, dodecylene, tridecylene, tetradecylene, pentadecylene, hexadecylene, heptadecylene, and octadecylene groups. The carbon number of the alkylene group is preferably 1 to 12.

Examples of the branched or unbranched C2 to C30 alkenylene groups for $R^{16}$ include vinylene; 1-propenylene, 2-propenylene, 1-butenylene, 2-butenylene, 1-pentenylene, 2-pentenylene, 1-hexenylene, 2-hexenylene, and 1-octenylene groups. The carbon number of the alkenylene group is preferably 2 to 12.

Examples of the branched or unbranched C2 to C30 alkynylene groups for $R^{16}$ include ethynylene, propynylene, butynylene, pentynylene, hexynylene, heptynylene, octynylene, nonynylene, decynylene, undecynylene, and dodecynylene groups. The carbon number of the alkynylene group is preferably 2 to 12.

In the silane coupling agent having the above structure, the total (x+y) of the number of repetitions (x) of the linking unit A and the number of repetitions (y) of the linking unit B is preferably in the range of 3 to 300. If the total number of repetitions is within the range mentioned above, the —$C_7H_{15}$ moiety of the linking unit A covers the mercaptosilane structure of the linking unit B, which enables to suppress shortening of scorch time and ensure good reactivity with silica or the rubber component.

Examples of the silane coupling agents having the above structure include NXT-Z30, NXT-Z45, and NXT-Z60 (Momentive Performance Materials). These may be used alone or in combinations of two or more.

The amount of the silane coupling agent represented by Formula (4) and/or the silane coupling agent containing the linking unit A represented by Formula (5) and the linking unit B represented by Formula (6) is preferably 1 part by mass or more, more preferably 5 parts by mass or more, and particularly preferably 8 parts by mass or more, per 100 parts by mass of silica. If the amount is less than 1 part by mass, the braking strength and the abrasion resistance tend to be significantly reduced. The amount is preferably 15 parts by mass or less, and more preferably 10 parts by mass or less, per 100 parts by mass of silica. If the amount is more than 15 parts by mass, the effects of the silane coupling agent (s) added, such as improvement in tensile strength at break and abrasion resistance and reduction in rolling resistance, tend to be insufficiently exerted.

When the silane coupling agent represented by Formula (4) and the silane coupling agent containing the linking unit A represented by Formula (5) and the linking unit B represented by Formula (6) are used in combination, the amount means the combined amount of these silane coupling agents.

If other silane coupling agents such as sulfide silane coupling agents are used in the present invention, the combined amount of the silane coupling agents used is preferably within the range mentioned above.

The rubber composition of the present invention contains a liquid resin having a specific softening point. The combined used of the liquid resin, the modified diene polymer, and silica synergistically improves fuel economy, wet grip performance, and abrasion resistance.

Examples of the liquid resins include liquid petroleum resins and liquid coal resins, such as liquid coumarone-indene resins, liquid indene resins, liquid α-methylstyrene resins, liquid vinyltoluene resins, and liquid polyisopentane resins. The liquid resin is preferably at least one selected from the group consisting of liquid coumarone-indene resins, liquid indene resins, and liquid α-methylstyrene resins, and more preferably liquid coumarone-indene resins.

The liquid resin preferably has a softening point of −20° C. or higher, preferably −5° C. or higher, and more preferably 0° C. or higher. If the liquid resin has a softening point of lower than −20° C., the liquid resin tends to have so low viscosity that it can have deteriorated compatibility with the rubber component. The liquid resin has a softening point of 20° C. or lower, preferably 18° C. or lower, and more preferably 17° C. or lower. If the liquid resin has a softening point of higher than 20° C., the liquid resin tends to provide increased heat build-up, failing to sufficiently improve fuel economy. The abrasion resistance also tends to be reduced.

The softening point herein is measured as set forth in JIS K 6220:2001 with a ring and ball softening point apparatus, and refers to the temperature at which the ball drops down.

The amount of the liquid resin per 100 parts by mass of the rubber component is preferably 3 parts by mass or more, more preferably 5 parts by mass or more, even more preferably 10 parts by mass or more, and particularly preferably 15 parts by mass or more. If the amount of the liquid resin is less than 3 parts by mass, the effect of the liquid resin added may be insufficiently exerted. The amount of the liquid resin is preferably 40 parts by mass or less, more preferably 30 parts by mass or less, and particularly preferably 25 parts by mass or less. If the amount of the liquid resin is more than 40 parts by mass, the fuel economy and abrasion resistance tend to be deteriorated.

Since the liquid resin has the effect of softening a rubber composition, the use of the liquid resin can reduce the amount of oil in the rubber composition, further improving fuel economy. In the rubber composition of the present invention, the amount of oil is preferably 15 parts by mass or less, more preferably 1 part by mass or less, and particularly preferably 0 parts by mass (substantially oil-free), per 100 parts by mass of the rubber component.

The rubber composition of the present invention preferably contains carbon black. The carbon black provides good reinforcement and further improves abrasion resistance.

The carbon black is not particularly limited, and examples thereof include GPF, HAF, ISAF, and SAF.

The carbon black preferably has a nitrogen adsorption specific surface area ($N_2SA$) of 30 m$^2$/g or greater, more preferably 70 m$^2$/g or greater, and particularly preferably 100 m$^2$/g or greater. If the carbon black has a $N_2SA$ of smaller than 30 m$^2$/g, the carbon black may provide insufficient reinforcement. The carbon black preferably has a $N_2SA$ of 250 m$^2$/g or smaller, more preferably 150 m$^2$/g or smaller, and particularly preferably 125 m$^2$/g or smaller. If the carbon black has a $N_2SA$ of 250 m$^2$/g or greater, the rubber composition before vulcanization tends to have a significantly high viscosity and thus poor processability. The fuel economy also tends to be deteriorated.

The nitrogen adsorption specific surface area of carbon black can be measured in accordance with JIS K6217-2: 2001.

The carbon black preferably has a dibutyl phthalate (DBP) oil absorption of 70 ml/100 g or greater, and more preferably 90 ml/100 g or greater. The carbon black also preferably has a DBP oil absorption of 160 ml/100 g or smaller, and more preferably 125 ml/100 g or smaller. If the DBP oil absorption is within the range mentioned above, a balanced improvement in fuel economy, wet grip performance, and abrasion resistance can be achieved.

The DBP oil absorption of carbon black can be measured in accordance with JIS K6217-4:2001.

If the rubber composition of the present invention contains carbon black, the amount of carbon black per 100 parts by mass of the rubber component is preferably 5 parts by mass or more, and more preferably 8 parts by mass or more. If the amount of carbon black is less than 5 parts by mass, the effect of carbon black added may be insufficiently exerted. The amount of carbon black is preferably 60 parts by mass or less, more preferably 20 parts by mass or less, and particularly preferably 15 parts by mass or less. If the amount of carbon black is more than 60 parts by mass, the fuel economy tends to be deteriorated.

The silica content based on 100% by mass in total of silica and carbon black is preferably 60% by mass or more and preferably 80% by mass or more, and is preferably 98% by mass or less, and more preferably 95% by mass or less. If the silica content is within the range mentioned above, a balanced improvement in fuel economy, wet grip performance, and abrasion resistance can be achieved at high levels.

In the present invention, a vulcanization accelerator may be used. Examples of usable vulcanization accelerators include sulfenamide-, thiazole-, thiuram-, thiourea-, guanidine-, dithiocarbamic acid-, aldehyde-amine-, aldehyde-ammonia-, imidaszoline-, and xanthate-type vulcanization accelerators. Preferred among these are sulfenamide-type vulcanization accelerators because they enable a high initial cure rate.

Examples of the sulfenamide vulcanization accelerators include N-tert-butyl-2-benzothiazolysulfenamide (TBBS), N-cyclohexyl-2-benzothiazolysulfenamide (CBS), and N,N'-dicyclohexyl-2-benzothiazolysulfenamide (DZ). TBBS and CBS are preferred among these.

In general, silane coupling agents containing a mercapto group are highly effective in improving fuel economy, but they have the disadvantages of causing scorch and deteriorating abrasion resistance.

In the present invention, the use of a vulcanization accelerator represented by Formula (7) below suppresses scorches and provides a balanced improvement in fuel economy, wet grip performance, and abrasion resistance even when a silane coupling agent containing a mercapto group is used. That is, the combined use of the silane coupling agent represented by Formula (4) and the vulcanization accelerator represented by Formula (7) prevents the deterioration of abrasion resistance and provides a balanced improvement in fuel economy, wet grip performance, and abrasion resistance while maintaining the effects of improving wet grip performance and fuel economy, which are due to the use of the silane coupling agent represented by Formula (4), at high levels.

Moreover, if the silane coupling agent containing a linking unit A represented by Formula (5) and a linking unit B represented by Formula (6) and the vulcanization accelerator represented by Formula (7) are used in combination, the vulcanization accelerator represented by Formula (7) and the linking unit A together synergistically suppress scorches and provide a balanced improvement in fuel economy, wet grip performance, and abrasion resistance.

[Chem. 16]

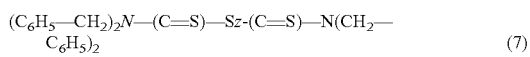
$$(C_6H_5-CH_2)_2N-(C=S)-Sz-(C=S)-N(CH_2-C_6H_5)_2 \quad (7)$$

In Formula (7), z represents an integer of 1 to 8 (preferably 1 to 6, and more preferably 1 to 3).

Examples of the vulcanization accelerators represented by Formula (7) include NOCCELER TBzTD (tetrabenzylthiuram disulfide) and NOCCELER TOT-N (tetrakis(2-ethylhexyl)thiuram disulfide) produced by Ouchi Shinko Chemical Industrial Co., Ltd. These vulcanization accelerators may be used alone or in combination of two or more thereof.

The amount of the vulcanization accelerator represented by Formula (7) per 100 parts by mass of the rubber component is preferably 0.1 parts by mass or more, and more preferably 0.2 parts by mass or more. If the amount is less than 0.1 parts by mass, the cure rate tends to be low. The amount of the vulcanization accelerator is preferably 2.5 parts by mass or less, more preferably 2.0 parts by mass or less, and even more preferably 1.8 parts by mass or less. If the amount is more than 2.5 parts by mass, blooming may occur.

The rubber composition of the present invention may appropriately contain, in addition to the components mentioned above, additives generally used in the preparation of rubber compositions, such as reinforcing fillers (e.g., clay), zinc oxide, stearicacid, various antioxidants, oils (e.g., aromatic oils), wax, vulcanizing agents (e.g., sulfur) and vulcanization accelerators.

The rubber composition of the present invention can be prepared by a known method. For example, the rubber composition is prepared by kneading the components in a rubber kneading apparatus such as an open roll mill and a Banbury mixer, and vulcanizing the resultant kneaded mixture.

The rubber composition of the present invention can be suitably used for tire components (in particular, a tread).

The pneumatic tire of the present invention can be produced by an ordinary method using the above-mentioned rubber composition. Specifically, an unvulcanized rubber composition to which various additives are optionally added is extruded and processed into the shape of a tire component (in particular, a tread), and then arranged in a usual manner on a tire building machine and assembled with other tire components to build an unvulcanized tire. Then, the unvulcanized tire is heated and pressed in a vulcanizer to prepare a tire.

The tire of the present invention can be suitably used as a tire for passenger cars, a tire for buses, a tire for trucks, or the like.

EXAMPLES

The present invention will be described in more detail with reference to, but not limited to, examples.

The various chemical agents used in preparation examples are listed below. The chemical agents were purified by common methods, if necessary.

Cyclohexane: a product of Tokyo Chemical Industry Co., Ltd. (purity: 99.5% or higher)

Styrene: a product of Tokyo Chemical Industry Co., Ltd. (purity: 99% or higher) 1,3-Butadiene: a product of Tokyo Chemical Industry Co., Ltd.

N,N,N',N'-tetramethylethylenediamine: a product of Wako Pure Chemical Industries, Ltd.

n-butyllithium: a product of Wako Pure Chemical Industries, Ltd.

Solution of 1,3-divinylbenzene in hexane (1.6 M): a product of Tokyo Chemical Industry Co., Ltd.

Isopropanol: a product of Wako Pure Chemical Industries, Ltd.

2,6-Tert-butyl-p-cresol: a product of Wako Pure Chemical Industries, Ltd.

Tetraglycidyl-1,3-bisaminomethylcyclohexane: a product of Wako Pure Chemical Industries, Ltd. (a compound (modifier) represented by the following formula)

[Chem. 17]

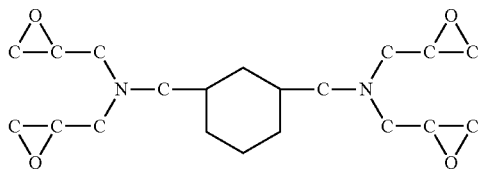

Methanol: a product of Kanto Chemical Co., Inc.

Preparation Example 1

(Preparation of Polymerization Initiator)

A 100-ml pressure resistant vessel sufficiently purged with nitrogen was charged with 10 ml of a solution of 1,3-divinylbenzene in hexane (1.6 M). Subsequently, 20 ml of a solution of n-butyllithium in hexane (1.6 M) was added dropwise to the vessel at 0° C. The mixture was stirred for one hour to provide a polymerization initiator solution.

Preparation Example 2

(Preparation of Diene Polymer (Modified Diene Polymer))

A 1000-ml pressure resistant vessel sufficiently purged with nitrogen was charged with 600 ml of cyclohexane, 0.12 mol of styrene, 0.8 mol of 1,3-butadiene, and 0.7 mmol N,N,N',N'-tetramethylethylenediamine. Subsequently, 1.5 ml of the polymerization initiator solution obtained in Preparation Example 1 was added to the vessel, and the mixture was stirred at 40° C. Three hours later, 1.0 mmol of tetraglycidyl-1,3-bisaminomethylcyclohexane as a modifier was added, and the resultant mixture was stirred again. One hour later, 3 ml of isopropanol was added to terminate the polymerization. To the reaction solution was added 1 g of 2,6-tert-butyl-p-cresol, and then the reaction solution was subjected to reprecipitaion with methanol. The precipitate was heated and dried to provide a diene polymer (a modified diene polymer having two or more modified moieties (e.g. modified chain ends)).

The obtained diene polymer was evaluated for the following properties.

(Mooney Viscosity)

The Mooney viscosity ($ML_{1+4}/100°$ C.) of the diene polymer was measured in accordance with JIS K 6300-1 "Rubber, unvulcanized—Physical property—Part 1: Determination of Mooney viscosity and pre-vulcanization characteristics with Mooney viscometer". That is, a Mooney viscosity tester was preheated for one minute to 100° C. and a small rotor was rotated at this temperature. After four-minute rotation, the Mooney viscosity was measured. Here, the obtained values were rounded to the nearest whole number. The Mooney viscosity of the diene polymer was found to be 60.

(Vinyl Content)

The vinyl content of the diene polymer was measured by infrared absorption spectrometry. The vinyl content of the diene polymer was found to be 57 mol %.

The various chemical agents used in examples and comparative examples are listed below.

Diene polymer: the diene polymer prepared in Preparation

Example 2

SBR: E15 (S-SBR coupled with a compound containing an epoxy group (tetraglycidyl-1,3-bisaminomethylcyclohexane); styrene unit content: 23% by mass; vinyl unit content: 64% by mass; end group: OH (one chain end-modified SBR)) produced by Asahi Kasei Chemicals Corporation BR: Nipol BR1220 (cis content: 97% by mass) produced by Zeon corporation

NR: RSS#3

Carbon black: DIABLAC N220 (N220, $N_2SA$: 114 $m^2/g$, DBP oil absorption: 114 ml/100 g) produced by Mitsubishi Chemical Corporation Silica: ULTRASIL VN3 ($N_2SA$: 175 $m^2/g$) produced by Degussa Liquid resin 1: NOVARES C10 (liquid coumarone-indene resin, softening point: 5° C. to 15° C.) produced by Rutgers Chemicals Liquid resin 2: NOVARES TL10 (liquid resin mainly derived from α-methylstyrene and indene; softening point: 5° C. to 15° C.) produced by Rutgers Chemicals Solid resin: NOVARES C90 (solid coumarone-indene resin, softening point: 85° C. to 95° C.) produced by Rutgers Chemicals Silane coupling agent 1: NXT-Z45 (a copolymer of a linking unit A and a linking unit B (linking unit A: 55 mol %, linking unit B: 45 mol %)) produced by Momentive Performance Materials Silane coupling agent 2: Si363 (a silane coupling agent represented by formula below (Formula (4) where $R^8$ is —O—$(C_2H_4$—O$)_5$—$C_{13}H_{27}$, $R^9$ is $C_2H_5$—O—, $R^{10}$ is —O—$(C_2H_4$—O$)_5$—$C_{13}H_{27}$, and $R^{11}$ is —$C_3H_6$—)) produced by Evonik Degussa

[Chem. 18]

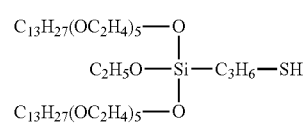

Zinc oxide: Zinc oxide #1 produced by Mitsui Mining & smelting Co., Ltd.

Stearic acid: Stearic acid "TSUBAKI" produced by NOF Corporation

Aromatic oil: Process X-140 produced by Japan Energy Corporation

Antioxidant: ANTIGENS 6C (N-(1,3-dimethylbutyl)-N'-phenyl-p-phenylenediamine) produced by Sumitomo Chemical Co., Ltd.

Wax: SUNNOC N produced by Ouchi Shinko Chemical Industrial Co., Ltd.

Sulfur: sulfur powder produced by Karuizawa Iou K. K.

Vulcanization accelerator 1: NOCCELER CZ (N-cyclohexyl-2-benzothiazolylsulfenamide) produced by Ouchi Shinko Chemical Industrial Co., Ltd.

Vulcanization accelerator 2: NOCCELER D (N,N'-diphenylguanidine) produced by Ouchi Shinko Chemical Industrial Co., Ltd.

Vulcanization accelerator 3: NOCCELER NS (N-tert-butyl-2-benzothiazolylsulfenamide) produced by Ouchi Shinko Chemical Industrial Co., Ltd.

Vulcanization accelerator 4: TBzTD (tetrabenzylthiuram disulfide, a compound represented by Formula (7) where z=2) produced by Flexsys Examples and Comparative Examples The chemical agents, except the sulfur and vulcanization accelerators, in amounts shown in Table 1 or 2 were mixed and kneaded with a Banbury mixer at 165° C. for four minutes to provide a kneaded mixture. Subsequently, the sulfur and vulcanization accelerators were added to the kneaded mixture, and the resulting mixture was kneaded using an open roll mill at 80° C. for four minutes to provide an unvulcanized rubber composition. The unvulcanized rubber composition was formed into the shape of a tread, and assembled with other tire components. The assembly was then vulcanized at 150° C. for 35 minutes at 25 kgf to prepare a test tire (tire size: 195/65R15).

The test tires prepared were evaluated for the following performances. The results are shown in Tables 1 and 2. Here, Comparative Examples 7 and 14 are taken as Reference Comparative Examples in Tables 1 and 2, respectively.

(Fuel Economy)

Using a rolling resistance tester, the rolling resistance of each test tire was measured by running the tire with a rim of 15×6 JJ at an internal pressure of 230 kPa, a load of 3.43 kN, and a speed of 80 km/h. The results are expressed as indices relative to that of the Reference Comparative Example (=100). The higher the index is, the higher the level of fuel economy is.

(Wet Grip Performance)

The wet grip performance was evaluated based on the braking performance determined in an Anti-Lock Brake System (ABS) evaluation test. Specifically, each set of the test tires was mounted on a 1800-cc class passenger vehicle equipped with an ABS, and the vehicle was driven on an asphalt road (condition of road surface: wet, skid number: about 50). The brake was stepped on when the speed was 100 km/h, and the distance traveled until the vehicle stopped (stopping distance) was measured. The stopping distance of each formulation is expressed as a wet grip performance index relative to that of the Reference Comparative Example (~100), using the following equation. The higher the wet grip performance index is, the higher the level of the braking performance on a wet road, that is, the higher level of wet grip performance is.

(Wet grip performance index)=(stopping distance of Reference Comparative Example)/(stopping distance of each formulation)×100

(Abrasion Resistance)

Each set of the test tires were mounted on a 1800-cc class passenger vehicle equipped with an ABS, and the vehicle was driven 30000 km in an urban area. Thereafter, the decrease in the groove depth was measured, and the mileage at which the groove depth was decreased by 1 mm was calculated from the measurement. The result of the decrease in the groove depth of each formulation is expressed as an abrasion resistance index relative to that of the Reference Comparative Example (=100), using the following equation. The higher the abrasion resistance index is, the better the abrasion resistance is.

(Abrasion resistance index)=(the mileage at which the groove depth was decreased by 1 mm in each formulation)/(the mileage at which the groove depth was decreased by 1 mm in the tire of Reference Comparative Example)×100

TABLE 1

| | | Example 1 | Example 2 | Example 3 | Example 4 | Example 5 | Comparative Example 1 | Comparative Example 2 |
|---|---|---|---|---|---|---|---|---|
| Formulation (parts by mass) | Diene polymer | 100 | 100 | 100 | 80 | 80 | 100 | 80 |
| | SBR | — | — | — | — | — | — | — |
| | BR | — | — | — | 20 | — | — | 20 |
| | NR | — | — | — | — | 20 | — | — |
| | Silica | 75 | 75 | 75 | 75 | 75 | 75 | 75 |
| | Carbon black | 10 | 10 | 10 | 10 | 10 | 10 | 10 |
| | Liquid resin 1 | 10 | 20 | — | 20 | 20 | — | — |
| | Liquid resin 2 | — | — | 20 | — | — | — | — |
| | Solid resin | — | — | — | — | — | — | — |
| | Silane coupling agent 1 | 6 | 6 | 6 | 6 | 6 | 6 | 6 |
| | Zinc oxide | 3 | 3 | 3 | 3 | 3 | 3 | 3 |
| | Stearic acid | 2 | 2 | 2 | 2 | 2 | 2 | 2 |
| | Antioxidant | 2 | 2 | 2 | 2 | 2 | 2 | 2 |
| | Wax | 2 | 2 | 2 | 2 | 2 | 2 | 2 |
| | Aromatic oil | 10 | — | — | — | — | 20 | 20 |
| | Sulfur | 1.8 | 1.8 | 1.8 | 1.8 | 1.8 | 1.8 | 1.8 |
| | Vulcanization accelerator 1 | 1.2 | 1.2 | 1.2 | 1.2 | 1.2 | 1.2 | 1.2 |
| | Vulcanization accelerator 2 | 1 | 1 | 1 | 1 | 1 | 1 | 1 |
| Evaluation | Fuel economy | 105 | 110 | 107 | 113 | 115 | 103 | 105 |
| | Wet grip performance | 110 | 115 | 110 | 102 | 100 | 105 | 103 |
| | Abrasion resistance | 105 | 105 | 105 | 110 | 108 | 100 | 103 |

TABLE 1-continued

|  |  | Comparative Example 3 | Comparative Example 4 | Comparative Example 5 | Comparative Example 6 | Comparative Example 7 |
|---|---|---|---|---|---|---|
| Formulation (parts by mass) | Diene polymer | 80 | 100 | 100 | — | — |
|  | SBR | — | — | — | 100 | 100 |
|  | BR | — | — | — | — | — |
|  | NR | 20 | — | — | — | — |
|  | Silica | 75 | 75 | 75 | 75 | 75 |
|  | Carbon black | 10 | 10 | 10 | 10 | 10 |
|  | Liquid resin 1 | — | — | 45 | 10 | — |
|  | Liquid resin 2 | — | — | — | — | — |
|  | Solid resin | — | 20 | — | — | — |
|  | Silane coupling agent 1 | 6 | 6 | 6 | 6 | 6 |
|  | Zinc oxide | 3 | 3 | 3 | 3 | 3 |
|  | Stearic acid | 2 | 2 | 2 | 2 | 2 |
|  | Antioxidant | 2 | 2 | 2 | 2 | 2 |
|  | Wax | 2 | 2 | 2 | 2 | 2 |
|  | Aromatic oil | 20 | — | — | 10 | 10 |
|  | Sulfur | 1.8 | 1.8 | 1.8 | 1.8 | 1.8 |
|  | Vulcanization accelerator 1 | 1.2 | 1.2 | 1.2 | 1.2 | 1.2 |
|  | Vulcanization accelerator 2 | 1 | 1 | 1 | 1 | 1 |
| Evaluation | Fuel economy | 108 | 90 | 95 | 100 | 100 |
|  | Wet grip performance | 100 | 110 | 120 | 102 | 100 |
|  | Abrasion resistance | 101 | 95 | 90 | 100 | 100 |

TABLE 2

|  |  | Example 6 | Example 7 | Example 8 | Example 9 | Example 10 | Example 11 | Example 12 | Comparative Example 8 |
|---|---|---|---|---|---|---|---|---|---|
| Formulation (parts by mass) | Diene polymer | 100 | 100 | 100 | 80 | 80 | 100 | 100 | 100 |
|  | SBR | — | — | — | — | — | — | — | — |
|  | BR | — | — | — | 20 | — | — | — | — |
|  | NR | — | — | — | — | 20 | — | — | — |
|  | Silica | 75 | 75 | 75 | 75 | 75 | 75 | 75 | 75 |
|  | Carbon black | 10 | 10 | 10 | 10 | 10 | 10 | 10 | 10 |
|  | Liquid resin 1 | 10 | 20 | — | 20 | 20 | 10 | 10 | — |
|  | Liquid resin 2 | — | — | 20 | — | — | — | — | — |
|  | Solid resin | — | — | — | — | — | — | — | — |
|  | Silane coupling agent 1 | — | — | — | — | — | 6 | — | — |
|  | Silane coupling agent 2 | 6 | 6 | 6 | 6 | 6 | — | 6 | 6 |
|  | Zinc oxide | 3 | 3 | 3 | 3 | 3 | 3 | 3 | 3 |
|  | Stearic acid | 2 | 2 | 2 | 2 | 2 | 2 | 2 | 2 |
|  | Antioxidant | 2 | 2 | 2 | 2 | 2 | 2 | 2 | 2 |
|  | Wax | 2 | 2 | 2 | 2 | 2 | 2 | 2 | 2 |
|  | Aromatic oil | 10 | — | — | — | — | 10 | 10 | 20 |
|  | Sulfur | 1.8 | 1.8 | 1.8 | 1.8 | 1.8 | 1.8 | 1.8 | 1.8 |
|  | Vulcanization accelerator 3 | 1.2 | 1.2 | 1.2 | 1.2 | 1.2 | 1.2 | 3 | 1.2 |
|  | Vulcanization accelerator 4 | 1 | 1 | 1 | 1 | 1 | 1 | — | 1 |
| Evaluation | Fuel economy | 105 | 110 | 107 | 113 | 115 | 106 | 105 | 103 |
|  | Wet grip performance | 110 | 115 | 110 | 102 | 100 | 110 | 110 | 105 |
|  | Abrasion resistance | 105 | 105 | 105 | 110 | 108 | 105 | 102 | 100 |

|  |  | Comparative Example 9 | Comparative Example 10 | Comparative Example 11 | Comparative Example 12 | Comparative Example 13 | Comparative Example 14 |
|---|---|---|---|---|---|---|---|
| Formulation (parts by mass) | Diene polymer | 80 | 80 | 100 | 100 | — | — |
|  | SBR | — | — | — | — | 100 | 100 |
|  | BR | 20 | — | — | — | — | — |
|  | NR | — | 20 | — | — | — | — |
|  | Silica | 75 | 75 | 75 | 75 | 75 | 75 |
|  | Carbon black | 10 | 10 | 10 | 10 | 10 | 10 |
|  | Liquid resin 1 | — | — | — | 45 | 10 | — |
|  | Liquid resin 2 | — | — | — | — | — | — |
|  | Solid resin | — | — | 20 | — | — | — |
|  | Silane coupling agent 1 | — | — | — | — | — | — |
|  | Silane coupling agent 2 | 6 | 6 | 6 | 6 | 6 | 6 |
|  | Zinc oxide | 3 | 3 | 3 | 3 | 3 | 3 |
|  | Stearic acid | 2 | 2 | 2 | 2 | 2 | 2 |
|  | Antioxidant | 2 | 2 | 2 | 2 | 2 | 2 |
|  | Wax | 2 | 2 | 2 | 2 | 2 | 2 |
|  | Aromatic oil | 20 | 20 | — | — | 10 | 10 |
|  | Sulfur | 1.8 | 1.8 | 1.8 | 1.8 | 1.8 | 1.8 |
|  | Vulcanization accelerator 3 | 1.2 | 1.2 | 1.2 | 1.2 | 1.2 | 1.2 |
|  | Vulcanization accelerator 4 | 1 | 1 | 1 | 1 | 1 | 1 |

| Evaluation | Fuel economy | 105 | 108 | 90 | 95 | 100 | 100 |
| | Wet grip performance | 103 | 100 | 110 | 120 | 102 | 100 |
| | Abrasion resistance | 103 | 101 | 95 | 90 | 100 | 100 |

Tables 1 and 2 show that the examples, in which a modified specific diene polymer, silica, and a predetermined amount of a liquid resin having a specific softening point were used in combination, provided improved fuel economy, wet grip performance, and abrasion resistance.

In addition, the comparison between Example 1 and Comparative Examples 1, 6, and 7 and the comparison between Example 6 and Comparative Examples 8, 13, and 14 demonstrated that the combined use of the above three components synergistically improves fuel economy, wet grip performance, and abrasion resistance.

Also, the comparison between Example 6 and Example 12 shows that, even when a silane coupling agent containing a mercapto group (a silane coupling agent represented by the Formula (4)) is used, the use of a vulcanization accelerator represented by the Formula (7) (tetrabenzylthiuram disulfide (TBzTD), a compound represented by the Formula (7) where z=2)) in combination with the silane coupling agent prevents the deterioration of abrasion resistance while maintaining high levels of the effects of improving wet grip performance and fuel economy, which are provided by the use of the silane coupling agent containing a mercapto group, and therefore provides a balanced improvement in fuel economy, wet grip performance, and abrasion resistance.

The invention claimed is:

1. A rubber composition for tires, comprising:
a diene polymer;
silica; and
a liquid resin having a softening point of −20° C. to 20° C., which is at least one selected from the group consisting of liquid coumarone-indene resins, liquid indene resins, and liquid α-methylstyrene resins,
the diene polymer being a modified diene polymer obtained by reacting a component (A) and a component (B),
the liquid resin being present in an amount of 3 to 40 parts by mass per 100 parts by mass of a rubber component of the rubber composition,
the silica being present in an amount of 30 to 120 parts by mass per 100 parts by mass of a rubber component of the rubber composition,
the component (A) being an active alkali metal-terminated conjugated diene polymer obtained by polymerizing a conjugated diene monomer alone or with an aromatic vinyl monomer, in the presence of a component (C), wherein the conjugated diene monomer is at least one of 1,3-butadiene or isoprene, and the aromatic vinyl monomer is styrene,
the component (B) being a modifier containing a functional group,
the component (C) being a chemical species obtained by reacting an organic alkali metal compound and a compound represented by the following Formula (2):

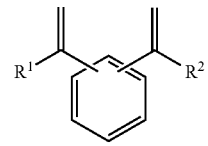

wherein $R^1$ and $R^2$ are the same as or different from each other, each representing a hydrogen atom, a branched or unbranched alkyl group, or a branched or unbranched aryl group, and
the component (B) modifier being a compound represented by the following Formula (3):

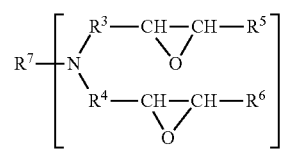

wherein $R^3$ and $R^4$ are the same as or different from each other, each representing a $C_1$ to $C_3$ alkylene group; $R^5$ and $R^6$ both represent a hydrogen atom; $R^7$ represents a $C_6$ to $C_{10}$ cycloalkylene group; and n represents an integer of 2.

2. The rubber composition for tires according to claim 1, wherein the same component (B) modifier is introduced into both chain ends of the active conjugated diene polymer.

3. The rubber composition for tires according to claim 1, wherein the rubber component contains 5% by mass or more of the diene polymer based on 100% by mass of the rubber component.

4. The rubber composition for tires according to claim 1, wherein the modified diene polymer is a modified styrene butadiene rubber obtained by polymerizing 1,3-butadiene and styrene.

5. The rubber composition for tires according to claim 1, wherein the silica has a nitrogen adsorption specific surface area of 40 to 250 m²/g.

6. The rubber composition for tires according to claim 1, comprising
at least one of a silane coupling agent represented by Formula (4) below and a silane coupling agent containing a linking unit A represented by Formula (5) below and a linking unit B represented by Formula (6) below:

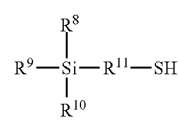

wherein $R^8$ represents a group represented by —O—($R^{12}$—O)$_m$—$R^{13}$ where m $R^{12}$s are the same as or different from one another, each representing a branched or unbranched divalent $C_1$ to $C_{30}$ hydrocarbon group, $R^{13}$ represents a branched or unbranched $C_1$ to $C_{30}$ alkyl group, a branched or unbranched $C_2$ to $C_{30}$ alkenyl group, a $C_6$ to $C_{30}$ aryl group, or a $C_7$ to $C_{30}$ aralkyl group, and m represents an integer of 1 to 30; $R^9$ and $R^{10}$ are the same as or different from each other, each representing a group as defined for $R^8$, a branched or unbranched $C_1$ to $C_{12}$ alkyl group, or a group represented by —O—$R^{14}$ where $R^{14}$ represents a hydrogen atom, a branched or unbranched $C_1$ to $C_{30}$ alkyl group, a branched or unbranched $C_2$ to $C_{30}$ alkenyl group, a $C_6$ to $C_{30}$ aryl group, or a $C_7$ to $C_{30}$ aralkyl group; and $R^{11}$ represents a branched or unbranched $C_1$ to $C_{30}$ alkylene group;

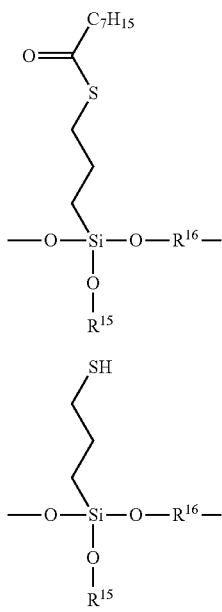

wherein $R^{15}$ represents hydrogen, a halogen, a branched or unbranched $C_1$ to $C_{30}$ alkyl group, a branched or unbranched $C_2$ to $C_{30}$ alkenyl group, a branched or unbranched $C_2$ to $C_{30}$ alkynyl group, or a group obtained by replacing a terminal hydrogen of the alkyl group with a hydroxyl or carboxyl group; and $R^{16}$ represents a branched or unbranched $C_1$ to $C_{30}$ alkylene group, a branched or unbranched $C_2$ to $C_{30}$ alkenylene group, or a branched or unbranched $C_2$ to $C_{30}$ alkynylene group, provided that $R^{15}$ and $R^{16}$ together may form a ring.

7. The rubber composition for tires according to claim 1, further comprising a vulcanization accelerator represented by the following Formula (7):

$$(C_6H_5-CH_2)_2N-(C=S)-S_z-(C=S)-N(CH_2-C_6H_5)_2 \quad (7)$$

wherein z represents an integer of 1 to 8.

8. A pneumatic tire having a tread formed from the rubber composition for tires according to claim 1.

9. A pneumatic tire, comprising the rubber composition according to claim 1.

10. The rubber composition for tires according to claim 6, wherein the same component (B) modifier is introduced into both chain ends of the active conjugated diene polymer.

11. The rubber composition for tires according to claim 6, wherein the rubber component contains 5% by mass or more of the diene polymer based on 100% by mass of the rubber component.

12. The rubber composition for tires according to claim 2, wherein the rubber component contains 5% by mass or more of the diene polymer based on 100% by mass of the rubber component.

* * * * *